US008287387B2

(12) United States Patent
Lesley

(10) Patent No.: US 8,287,387 B2
(45) Date of Patent: Oct. 16, 2012

(54) INSERT HAVING STORAGE SPACE FOR A CONVERTIBLE AREA OF AN ELECTRONIC GAMING MACHINE

(75) Inventor: Paul M. Lesley, Blue Island, IL (US)

(73) Assignee: WMS Gaming Inc., Waukegan, IL (US)

( * ) Notice: Subject to any disclaimer, the term of this patent is extended or adjusted under 35 U.S.C. 154(b) by 325 days.

(21) Appl. No.: 12/616,173

(22) Filed: Nov. 11, 2009

(65) Prior Publication Data

US 2010/0120541 A1 May 13, 2010

Related U.S. Application Data

(60) Provisional application No. 61/114,174, filed on Nov. 13, 2008.

(51) Int. Cl.

| | |
|---|---|
| ***A63F 9/24*** | (2006.01) |
| ***A63F 13/00*** | (2006.01) |
| ***A63F 9/00*** | (2006.01) |
| ***G06F 17/00*** | (2006.01) |
| ***G06F 19/00*** | (2011.01) |
| ***A63B 71/00*** | (2006.01) |

(52) U.S. Cl. ......................... 463/46; 463/47; 273/148 R

(58) Field of Classification Search .................... 463/46, 463/47; 273/148 R See application file for complete search history.

(56) References Cited

U.S. PATENT DOCUMENTS

| | | | | |
|---|---|---|---|---|
| 6,722,985 | B2 | 4/2004 | Criss-Puszkiewicz et al. | |
| 6,866,265 | B2 * | 3/2005 | Luciano et al. | 273/148 R |
| 6,997,810 | B2 | 2/2006 | Cole | |
| 7,267,613 | B2 | 9/2007 | Cole | |
| 7,374,488 | B2 | 5/2008 | Schober et al. | |
| 7,641,555 | B2 | 1/2010 | McKinley et al. | |
| 8,006,980 | B1 * | 8/2011 | Herro et al. | 273/342 |
| 2005/0049043 | A1 * | 3/2005 | Crivelli et al. | 463/29 |
| 2007/0204629 | A1 * | 9/2007 | Lofy | 62/3.61 |
| 2009/0264194 | A1 | 10/2009 | Kompella | |

* cited by examiner

*Primary Examiner* — Peter DungBa Vo
*Assistant Examiner* — Wei Li
(74) *Attorney, Agent, or Firm* — Nixon Peabody LLP

(57) ABSTRACT

A convertible gaming machine includes a gaming cabinet, at least one display, and a convertible area. The gaming cabinet has a ledge portion with a top surface. The at least one display is mounted to the gaming cabinet and is configured to display a randomly selected outcome from a wagering game. The randomly selected outcome is selected from a plurality of outcomes in response to receiving a wager input from a player. The convertible area is located entirely below the at least one display and partially below the top surface of the ledge portion. The convertible area is convertible at least between a first configuration and a second configuration, the first configuration including a player tracking system, the second configuration including an insert having a storage portion configured to store one or more patron items. The insert replaces the player tracking system.

22 Claims, 5 Drawing Sheets

INSERT HAVING STORAGE SPACE FOR A CONVERTIBLE AREA OF AN ELECTRONIC GAMING MACHINE

CROSS-REFERENCE TO RELATED APPLICATIONS

This application claims the benefit of U.S. Provisional Application No. 61/114,174, filed Nov. 13, 2008, which is hereby incorporated-by-reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and methods for playing wagering games, and more particularly, to wagering games having convertible areas.

BACKGROUND OF THE INVENTION

Gaming machines or terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

Casinos strive to accommodate a maximum number of gaming machines to maximize profits and choices for patrons. Some casinos maximize the number of gaming machines employing optimal floor and wall space configurations. Such space optimization requires the gaming machines to have gaming cabinets with specific dimensions. The specific dimensions of the gaming machines include a width dimension, a depth dimension, and a height dimension. Gaming machine manufacturers take into consideration each of these dimensions for a number of reasons.

For example, the width of each gaming machine determines how many gaming machines can be positioned side-to-side along the walls or on the floor of the casino. Thus, gaming machine manufacturers strive to minimize the overall width of the gaming cabinets, while incorporating all of the necessary components to allow the gaming machine to work and while maintaining a certain level of enjoyment and excitement for a player. Additionally, gaming machine manufacturers strive to provide gaming machines with widths that provide an appropriate amount of personal space for players of side-to-side gaming machines so as not to interfere with the players' enjoyment and excitement.

In another example, the depth of each gaming machine determines how many rows of gaming machines can be positioned back-to-back in the center of the casino floor. Gaming machines having relatively larger depths result in rows of back-to-back gaming machines having an overall larger depth, which reduces the number of back-to-back rows of gaming machines that can fit on the floor of a particular casino. Thus, gaming machine manufacturers strive to minimize the overall depth of the gaming cabinets.

Additionally, the height of each gaming machine can affect a final placement of the gaming machine in the casino. For example, security and operational procedures typically require casinos to position taller or larger gaming machines along the casino's walls and to place shorter or smaller gaming machines in the center of the casino floor. Taller gaming machines are generally not placed in the center of a casino floor because they can pose obstacles for security staff and video cameras. Other reasons for minimizing the height of a gaming machine include: maintaining open floor plans for aesthetic reasons, enabling exit sign visibility to patrons, and reducing obstructions of popular attractions within the casino property. Thus, gaming machine manufacturers strive to minimize the overall height of the gaming cabinets.

In some cases, a gaming board regulates the exterior dimensions of the gaming cabinets. Thus, internal space for components of gaming machines is at a premium. As gaming machines become more complex requiring more and more components, gaming machine manufacturers and casinos must decide what components must be housed within the gaming cabinet and what components can be eliminated or located externally to the gaming machine to reduce or maintain the gaming machine's cabinet size, thereby optimizing the casino's floor space.

For example, some gaming machines provide player tracking components, located within the gaming cabinet, for tracking a player's gaming habits and other related information. Casinos operating these gaming machines generally maintain a player tracking network for communicating with the player tracking components, which can be complicated and costly. Thus, some casinos have removed the player tracking components from the gaming machines for these and/or other reasons, which leaves a hole or a void in the gaming machine.

As space within gaming machines is at a premium, gaming machine manufacturers have failed to provide useful space for a player to store or place personal items.

SUMMARY OF THE INVENTION

According to one aspect of the present disclosure, there is provided an insert having useful storage space for a convertible gaming machine that fills a void in the convertible gaming machine when a component is removed, thereby enhancing the player's comfort and enjoyment of the gaming experience.

According to another aspect of the disclosure, a convertible gaming machine includes a gaming cabinet, at least one display, and a convertible area. The gaming cabinet has a ledge portion with a top surface. The at least one display is mounted to the gaming cabinet and is configured to display a randomly selected outcome from a wagering game. The randomly selected outcome is selected from a plurality of outcomes in response to receiving a wager input from a player. The convertible area is located entirely below the at least one display and partially below the top surface of the ledge portion. The convertible area is convertible at least between a first configuration and a second configuration, the first configuration including a player tracking system, the second configuration including an insert having a storage portion configured to store one or more patron items. The insert replaces the player tracking system.

According to yet another aspect of the disclosure, a gaming machine includes a gaming cabinet, at least one display, and a convertible area. The at least one display is mounted to the gaming cabinet and is configured to display a randomly selected outcome from a wagering game. The randomly selected outcome is selected from a plurality of outcomes in response to receiving a wager input from a player. The convertible area has a first configuration and a second configuration, the first configuration including one or more gaming components that are positioned at least in part on an external surface of the gaming cabinet, the second configuration replacing at least one of the gaming components with an insert having a storage portion.

According to another aspect of the disclosure a method for converting a gaming machine includes providing the gaming machine with a convertible area in a first configuration and removing the gaming components from the convertible area to create a void in a gaming cabinet of the gaming machine. The convertible area includes one or more gaming components. The method further includes providing a unitary insert having a usable storage space portion configured to store one or more patron items and positioning the unitary insert in the void for converting the gaming machine from the first configuration to a second configuration.

According to yet another aspect of the disclosure a method of conducting a wagering game on a gaming machine includes receiving a wager input from a player and in response to receiving the wager input, displaying a randomly selected outcome on at least one display mounted to a gaming cabinet of the gaming machine. The method further includes storing one or more items in a convertible area of the gaming machine. The convertible area included an insert positioned partially below the at least one display and the insert has a surface that is positioned partially below a top surface of a ledge portion of the gaming machine.

According to another aspect of the disclosure a convertible gaming machine includes a gaming cabinet, at least one display, and a convertible area. The gaming cabinet has an extended front ledge portion with a substantially planar top surface. The at least one display is mounted to the gaming cabinet and is configured to display a randomly selected outcome from a wagering game. The randomly selected outcome is selected from a plurality of outcomes in response to receiving a wager input from a player. The convertible area is located entirely below the at least one display and partially below the substantially planar top surface of the front extended ledge portion. The convertible area has a first configuration and a second configuration, the first configuration including one or more gaming components, the second configuration replacing the gaming components with a unitary insert having a usable storage portion. The unitary insert is positioned to fill a void created by removal of the gaming components.

Additional aspects of the invention will be apparent to those of ordinary skill in the art in view of the detailed description of various embodiments, which is made with reference to the drawings, a brief description of which is provided below.

DETAILED DESCRIPTION

Figure 1:
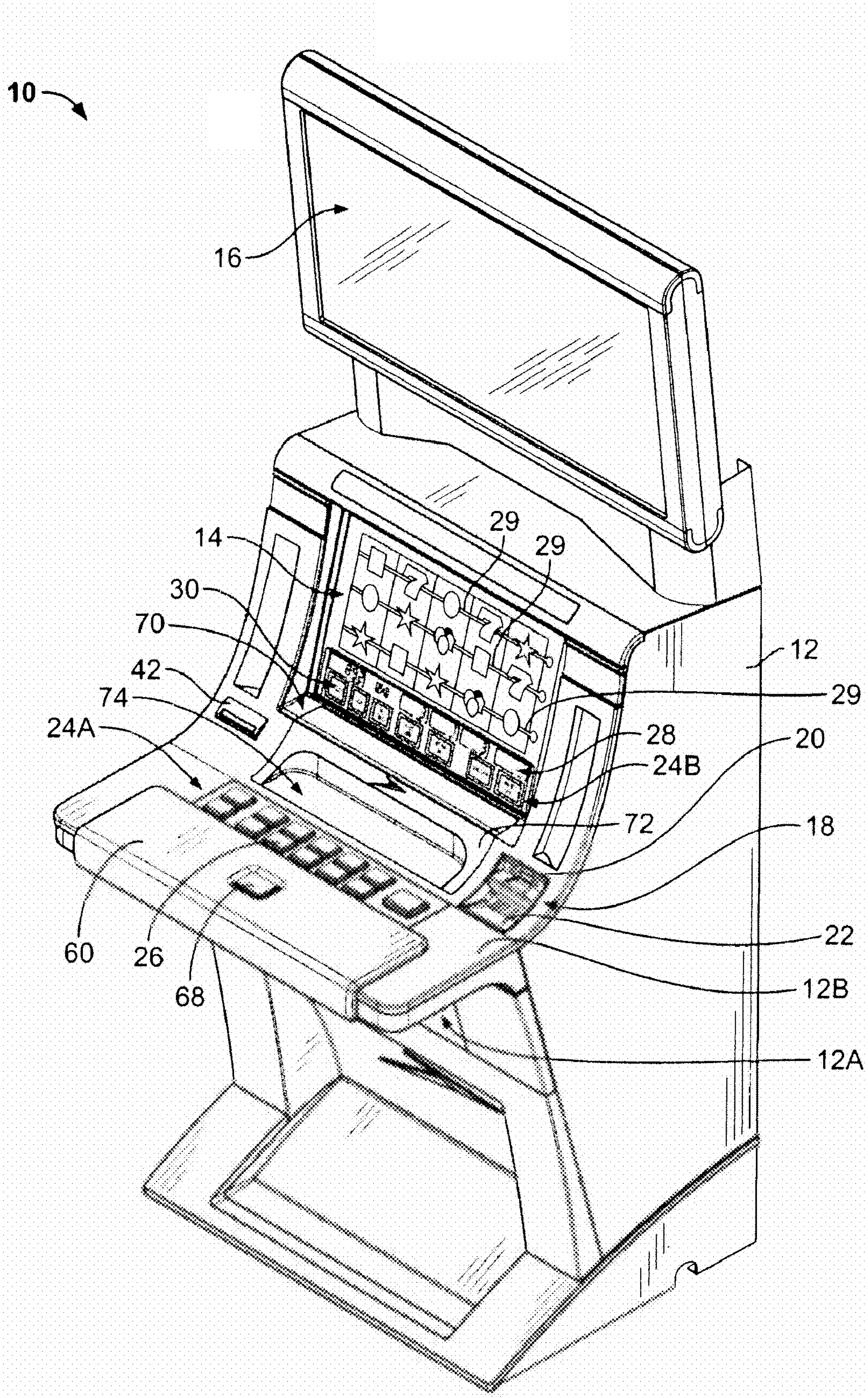
FIG. 1 is a perspective view of a free-standing gaming machine according to some embodiments of the present disclosure.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present disclosure, the gaming machine 10 may be any type of gaming terminal or machine and may have varying structures and methods of operation. For example, the gaming machine 10 may be an electromechanical gaming terminal configured to play mechanical slots, or it may be an electronic gaming terminal configured to play a video casino game, such as slots, keno, poker, blackjack, roulette, etc.

The gaming machine 10 is a convertible gaming machine 10 that can be converted between a plurality of configurations. The gaming machine 10 includes a gaming cabinet 12, a primary display 14, a secondary display 16, value input devices 18, player-input devices 24, an adjustable playing area 60, and an elongated convertible area 70, although other numbers and types of devices and component arrangements are contemplated. The primary display 14 is fixedly mounted to the gaming cabinet 12. The primary display 14 displays information about a basic wagering game. The primary display 14 can also display information about a bonus wagering game and a progressive wagering game.

The secondary display 16 is fixedly mounted to the gaming cabinet 12. The primary display 14 and/or the secondary display 16 can be configured to display information associated with wagering games, non-wagering games, community games, progressives, advertisements, services, premium entertainment, text messaging, emails, alerts or announcements, broadcast information, subscription information, etc. A variety of other contemplated information may be displayed on the primary display 14 and/or on the secondary display 16.

While these typical components found in the gaming machine 10 are described below, it should be understood that numerous other elements may exist and may be used in any number of combinations to create various forms of the gaming machine 10.

The value input devices 18 may be provided in many forms, individually or in combination, and are preferably located on the front of the housing 12. The value input devices 18 receives currency and/or credits that are inserted by a player. The value input devices 18 may include a coin acceptor (not shown) for receiving coin currency. Alternatively, or in addition, the value input devices 18 may include a bill acceptor 22 for receiving paper currency. Furthermore, the value input device 18 may include an information reader 20, a ticket reader, or barcode scanner, for reading information stored on a credit ticket, a card, or other tangible portable credit storage device. The credit ticket or card may also authorize access to a central account, which can transfer money to the gaming machine 10.

The player-input device 24A is fixedly mounted to a front extended ledge portion 12A of the gaming cabinet 12. The player-input device 24A includes a plurality of buttons 26 for operating the gaming machine 10. The player-input-device 24A can include various other numbers and types of buttons, for example, two buttons, ten buttons, twenty buttons, etc. The buttons 26 are used in conjunction with items displayed on the primary display 14 and/or on the secondary display 16 to configure and/or play the wagering game on the gaming machine 10. The buttons 26 can include a variety of buttons including, but not limited to, mechanical-type push buttons, programmable buttons with variable displays, touch-screen buttons, or combinations thereof.

In addition, or alternatively, the gaming machine 10 includes the player-input device 24B, which comprises a touch screen 28 mounted by adhesive, tape, or the like over the primary display 14 and/or over the secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate soft touch key 30 or by pressing an appropriate button 26 on the button panel. The soft touch keys 30 may be used to implement the same functions as buttons 26. Alternatively, the buttons 26 may provide inputs for one aspect of the operating the game, while the soft touch keys 30 may allow for input needed for another aspect of the game.

A player of the gaming terminal 10 can manually and/or automatically adjust the position of the adjustable playing area 60 between a plurality of positions. The plurality of positions include a proximal position, which is near or closest to the gaming cabinet 12 and a distal position, which is furthest away from the gaming cabinet 12. The adjustable playing area 60 also has a plurality of extended intermediate positions. The adjustable playing area 60 includes a player-input button 68 mounted therein. The player-input button 68 can also be referred to as a moveable player-input button and/or a play button (e.g., a spin button for a slot game, a deal/draw button for a poker game, etc.).

The elongated convertible area 70 is positioned entirely below the primary display 14 and located partially below a top surface 12B of the front extended ledge portion 12A of the gaming cabinet 12, although other locations for the elongated convertible area 70 in the gaming cabinet 12 are contemplated. For example, the elongated convertible area 70 can be positioned above the top surface 12B of the front extended ledge portion 12A. The elongated convertible area 70 of the gaming machine 10 can be converted between a plurality of configurations including a first configuration (FIG. 3) including one or more gaming components and a second and third configuration (FIGS. 4A and 4B) including an elongated insert 72, 72' having usable storage space 74, 74'. The gaming machine 10, as shown in FIG. 1, is in the second configuration including the elongated insert 72 that forms the usable storage space 74. The elongated convertible area 70 is also generally referred to as a convertible area. The elongated convertible area 70 and the elongated insert 72, 72' are described in detail below with reference to FIGS. 4A and 4B.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming terminal 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming terminal 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 29.

A player begins play of the basic wagering game by making a wager via one or more of the value input devices 18 of the gaming machine 10. A player can select play by using one of the player input devices 24, via the buttons 26 or the soft touch keys 30. The basic game consists of a plurality of symbols arranged in an array, and includes at least one payline 29 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

According to some embodiments, the gaming machine 10 includes a player tracking system or module. The player tracking system includes components that allow for identification of a player by reading a card with information indicating his or her true identity. The player tracking system enables what is referred to as a casino loyalty club or program that may be used to award certain complimentary services as players collects points in his or her player-tracking account. The player tracking components can include an information reader 52 and a display 54, which are described in detail below in reference to FIG. 3.

Figure 2:
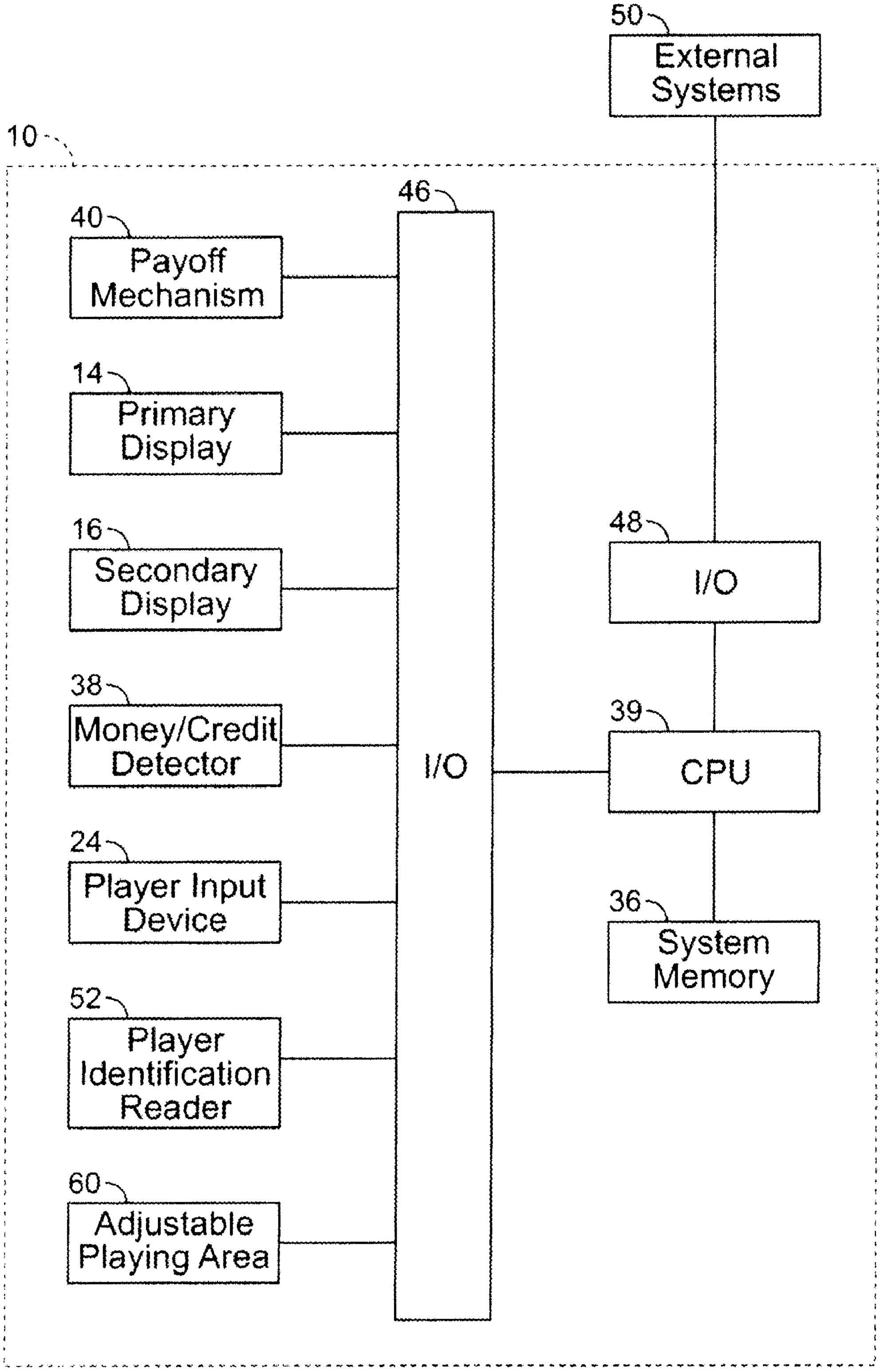
FIG. 2 is a schematic view of a gaming system according to some embodiments of the present disclosure.

Turning now to FIG. 2, the various components of the gaming machine 10 are controlled by a central processing unit (CPU) 39, also referred to herein as a controller or processor (such as a microcontroller or microprocessor). To provide gaming functions, the controller 39 executes one or more game programs stored in a computer readable storage medium, in the form of system memory 36. The controller 39 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 39 may include one or more microprocessors, including but not limited to a master processor, a slave processor, and a secondary or parallel processor.

The controller 39 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via one or more of the value input devices 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 39 is also connected to, and controls, the primary display 14, the secondary display 16, the value input devices 18, the player-input devices 24, a payoff mechanism 40, the information reader 52, and the adjustable playing area 60. The payoff mechanism 40 is operable in response to instructions from the controller 39 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes a ticket printer 42. Alternatively or additionally, the payoff mechanism 40 can include a coin outlet (not shown). However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 39 and both the peripheral components of the gaming machine 10 and external systems 50 occur through input/output (I/O) circuits 46, 48. More specifically, the controller 39 controls and receives inputs from the peripheral components of the gaming machine 10 through the input/output circuits 46. Further, the controller 39 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

The controller 39 can be coupled to the adjustable playing area 60 and/or a player-input button 68. The controller 39 can also communicate and/or control adjustable aspects of the adjustable playing area 60 and/or operational aspects of the player-input button 68. For example, the controller 39 can automatically adjust the adjustable playing area 60 upon the occurrence of a gaming event and/or a predetermined event. For another example, the controller 39 can switch the player-input button 68 on and off according to certain aspects.

The controller 39, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 39 may comprise one or more controllers or processors. In FIG. 2, the controller 39 in the gaming machine 10 is depicted as comprising a CPU, but the controller 39 may alternatively comprise a CPU in combination with other components, such as the I/O circuits 46, 48 and the system memory 36. The controller 39 may reside partially or entirely inside or outside of the gaming machine 10.

The gaming machine 10 may communicate with external systems 50 (in a wired or wireless manner) such that each terminal operates as a "thin client," having relatively less functionality, a "thick client," having relatively more functionality, or through any range of functionality therebetween (e.g., a "rich client"). As a generally "thin client," the gaming terminal may operate primarily as a display device to display the results of gaming outcomes processed externally, for example, on a server as part of the external systems 50. In this "thin client" configuration, the server executes game code and determines game outcomes (e.g., with a random number generator), while the controller 39 on board the gaming machine processes display information to be displayed on the display (s) of the gaming machine. In an alternative "rich client" configuration, the server determines game outcomes, while the controller 39 on board the gaming machine executes game code and processes display information to be displayed on the display(s) of the gaming machine. In yet another alternative "thick client" configuration, the controller 39 on board the gaming machine executes game code, determines game outcomes, and processes display information to be displayed on the display(s) of the gaming machine. Numerous alternative configurations are possible such that the aforementioned and other functions may be performed onboard or external to the gaming machine 10 as may be necessary for particular applications.

Security features are advantageously utilized where the gaming machine 10 communicate wirelessly with external systems 50, such as through wireless local area network (WLAN) technologies, wireless personal area networks (WPAN) technologies, wireless metropolitan area network (WMAN) technologies, wireless wide area network (WWAN) technologies, or other wireless network technologies implemented in accord with related standards or protocols (e.g., the Institute of Electrical and Electronics Engineers (IEEE) 802.11 family of WLAN standards, IEEE 802.11i, IEEE 802.11r (under development), IEEE 802.11w (under development), IEEE 802.15.1 (Bluetooth), IEEE 802.12.3, etc.). For example, a WLAN in accordance with some embodiments comprises a robust security network (RSN), a wireless security network that allows the creation of robust security network associations (RSNA) using one or more cryptographic techniques, which provides one system to avoid security vulnerabilities associated with IEEE 802.11 (the Wired Equivalent Privacy (WEP) protocol). Constituent components of the RSN may comprise, for example, stations (STA) (e.g., wireless endpoint devices such as laptops, wireless handheld devices, cellular phones, handheld gaming terminal 110, etc.), access points (AP) (e.g., a network device or devices that allow(s) an STA to communicate wirelessly and to connect to another network, such as a communication device associated with I/O circuit(s) 48), and authentication servers (AS) (e.g., an external system 50), which provide authentication services to STAs. Information regarding security features for wireless networks may be found, for example, in the National Institute of Standards and Technology (NIST), Technology Administration U.S. Department of Commerce, Special Publication (SP) 800-97, Establishing Wireless Robust Security Networks: A Guide to IEEE 802.11, and SP 800-48, Wireless Network Security: 802.11, Bluetooth and Handheld Devices, both of which are incorporated herein by reference in their entirety.

Figure 3:
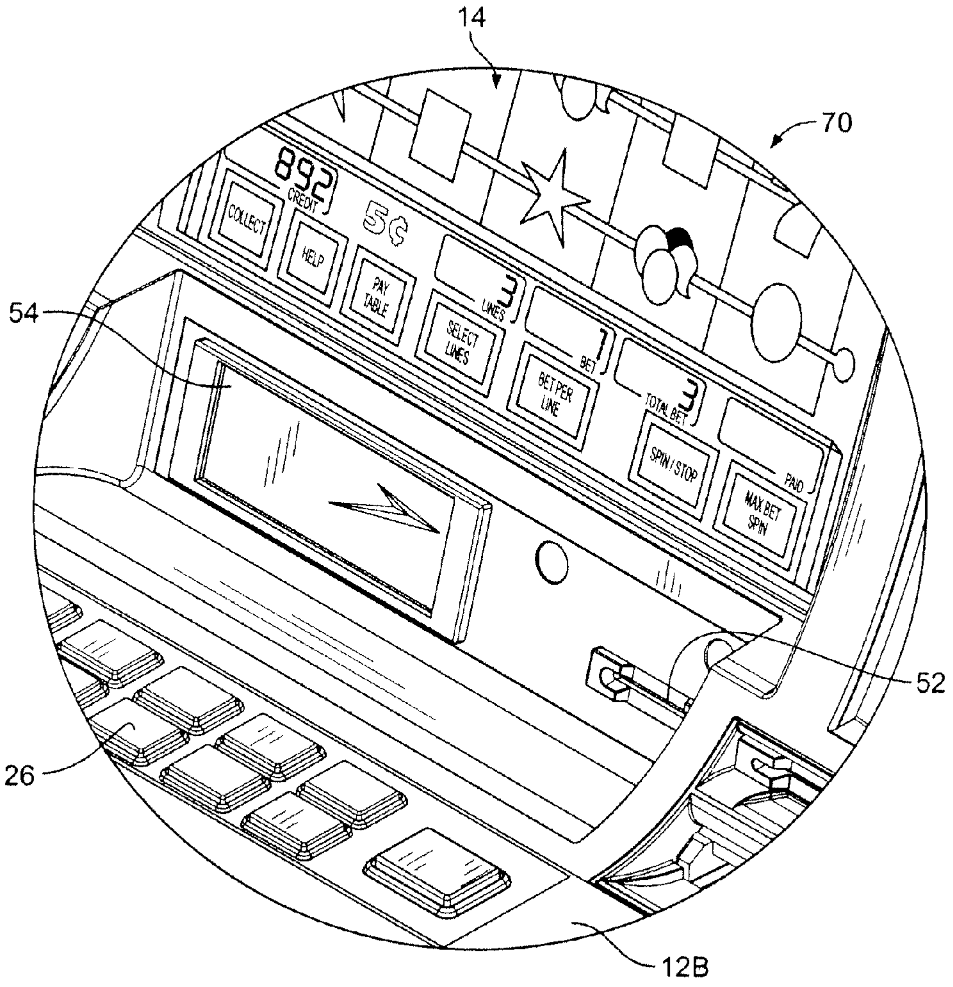
FIG. 3 is an enlarged perspective view of an elongated convertible area of the free-standing gaming machine of FIG. 1 in a first configuration.

Referring to FIG. 3, the elongated convertible area 70 of the gaming machine 10 is shown in the first configuration. In the first configuration, the elongated convertible area 70 includes the player tracking system, which includes the information reader 52 and the display 54, although other devices and component configurations are contemplated for the player tracking system. The information reader 52 can be a card reader, a ticket reader, a bar code scanner, an RFID transceiver, or a computer readable storage medium interface.

To use the player tracking system, a player inserts his or her card into the information reader 52, which allows the casino's computers or casino network to register and/or monitor that player's wagering at the gaming machine 10. The gaming machine 10 uses the display 54 to provide the player with information about his or her account or other player-specific information, although the primary display 14 and/or the secondary display 16 can be used individually or in combination.

While the first configuration includes player tracking components in the elongated convertible area 70, as shown in FIG. 3, it is contemplated that a plurality of other configurations exist with a number of different types and sizes of devices and component configurations in the elongated convertible area 70. For example, the plurality of configurations of the elongated convertible area 70 can include any combination of one or more of the following gaming components including, but not limited to, information readers, displays, player-input devices, player-tracking devices, buttons, speakers, lights, coin accepters, bill accepters, printers, etc.

Figure 4A:
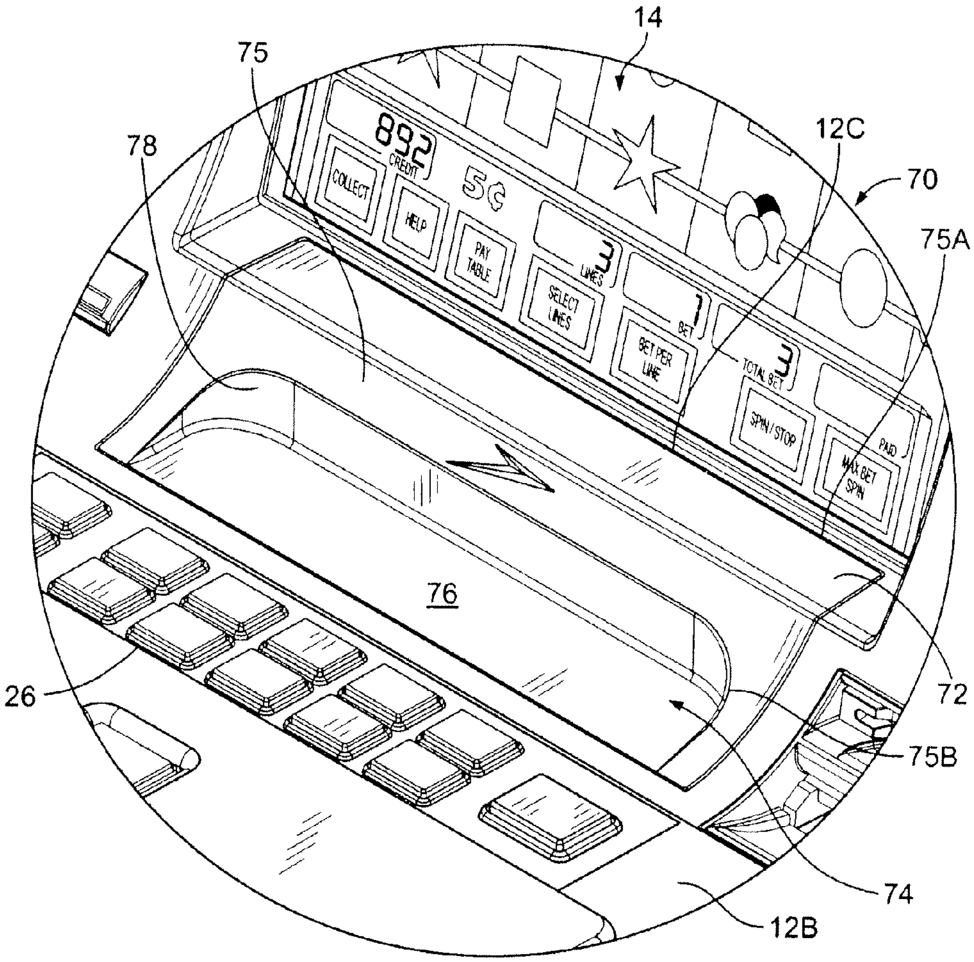
FIG. 4A is an enlarged perspective view of the elongated convertible area of the free-standing gaming machine of FIG. 1 in a second configuration.

Referring to FIG. 4A, the second configuration of the elongated convertible area 70 is shown. The second configuration of the elongated convertible area 70 includes the elongated insert 72 having the usable storage space 74. The elongated insert 72 is formed to fill a void or hole in the gaming cabinet 12 after one or more of the gaming components (e.g., the player tracking system) are removed and/or excluded from the elongated convertible area 70 of the gaming machine 10. The elongated insert 72 is also referred to as an aesthetically-pleasing insert, a unitary insert, or generally as an insert. The elongated insert 72 can be formed from a variety of materials including, but not limited to, metal, plastic, or a combination thereof.

The elongated insert 72 is configured to snap into position using clips (not shown), although a variety of other methods and techniques for securing the elongated insert 72 into the gaming cabinet 12 are contemplated. For example, the elongated insert 72 can be detachably connected to the gaming cabinet 12 using one or more of the following connection methods including, but not limited to, fasteners, adhesives, etc. The elongated insert 72 is entirely positioned below the primary display 14 and is elongated in a horizontal direction such that the elongated insert 72 is generally parallel to a lower horizontal edge of the primary display 14, although it is contemplated that the elongated insert 72 can be positioned in a number of other orientations. The elongated insert 72 has an upper contoured surface 75 with an outer perimeter edge 75A and an inner elongated "U" shaped edge 75B. The outer perimeter edge 75A is contoured to match and/or align with a portion of a perimeter edge 12C of the void in the gaming cabinet 12.

The usable storage space 74 comprises a substantially planar surface 76 and a partially curved back surface 78. The back surface 78 is adjacent to and extends upwardly from the planar surface 76. The back surface 78 can be vertical or sloped forwards or backwards. The back surface 78 is adjacent to and extends downwardly from the inner elongated "U" shaped edge 75B. A portion of the planar surface 76 is contoured to match and/or align with a portion of the perimeter edge 12C of the void in the gaming cabinet 12. Other configurations of the usable storage space 74 are contemplated. For example, the substantially planar surface 76 can be a sloped bottom portion that is sloped or tilted away from the top surface 12B of the front portion 12A of the gaming cabinet 12A. Such a sloped configuration of the surface 76 can prevent a spilled beverage or drink from reaching the buttons 26 of the player-input device 24A or from spilling on the player of the gaming machine 10. It is contemplated that the usable storage space 74 can be used to store coins, money, cell phones, keys, wallets, purses, pills, makeup, tickets, receipts, food, beverages, cigars, cigarettes, ashtrays, etc.

Figure 4B:
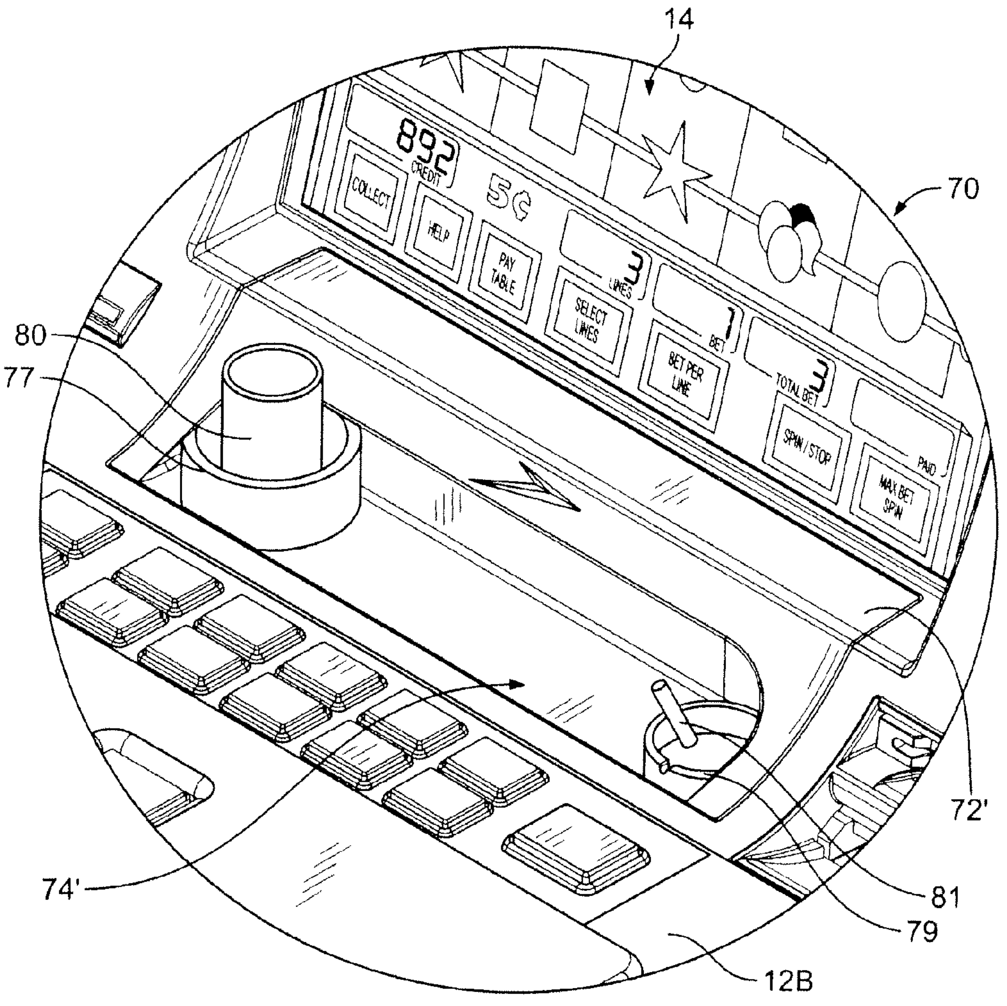
FIG. 4B is an enlarged perspective view of the elongated convertible area of the free-standing gaming machine of FIG. 1 in a third configuration.

Referring to FIG. 4B, the third configuration of the elongated convertible area 70 is shown. The third configuration of the elongated convertible area 70 includes the elongated insert 72' having the usable storage space 74'. The usable storage space 74' can be formed into a variety of shapes and sizes to store or hold a variety of items. For example, as shown in FIG. 4B, the usable storage space 74' is formed such that the elongated insert 72' includes a distinct cup holding portion 77 and an ashtray portion 79. A beverage 80 is shown being stored in the cup holding portion 77 and a cigarette 81 is shown being stored in the ashtray portion 79. The ashtray portion 79 can be formed from glass, metal, plastic, or a combination thereof. The ashtray can be rigidly affixed to the elongated insert 72' or formed as an integral portion thereof. According to some embodiments, the distinct cup holding portion 77 is insulated. The insulated cup holding portion can be insulated with one or more of a variety of materials including, but not limited to, foam, plastic, air, gel, styrofoam, etc. According to some embodiments, the distinct cup holding portion is refrigerated and/or heated. In these embodiments, the elongated insert 72' includes a switch (not shown) operable to turn cooling/heating elements in the distinct cup holding portion 77 on and off.

According to some embodiments, the usable storage space 74, 74' is formed to store one or more particular items. For example, the usable storage space 74, 74' can be formed with a rectangular portion or an oval portion configured to store a cell phone. For another example, the usable storage space 74, 74' can be formed to store a deck of playing cards and/or a pack of cigarettes. It is contemplated that the usable storage space 74, 74' can be formed with a plurality of other storage portions specially configured to store one or more particular items.

Referring generally to FIGS. 3 and 4A, an exemplary cycle of converting the elongated convertible area 70 of the gaming machine 10 from a first configuration to a second configuration is described below according to some embodiments. The gaming machine 10 starts in the first configuration as shown in FIG. 3, which includes the player tracking system (e.g., the information reader 52 and the display 54). A customer (e.g., a casino) decides not use the player tracking and wants to remove and/or excluded the player tracking components from the gaming machine 10. After the player tracking components are removed and/or excluded from the gaming machine 10, a void or hole is present in the gaming cabinet 12 below the primary display 14. The elongated insert 72 is formed and/or supplied to fill the void in the gaming cabinet 12, while providing the usable storage space 74 without increasing the overall dimensions of the gaming cabinet 12. The elongated insert 72 is snapped into the elongated convertible area 70, thereby converting the elongated convertible area 70 of the gaming machine 10 from the first configuration into the second configuration, as shown in FIG. 4A.

Each of these embodiments and obvious variations thereof is contemplated as falling within the spirit and scope of the claimed invention, which is set forth in the following claims.

What is claimed is:

1. A method for converting a gaming machine, the method comprising:

providing the gaming machine with a convertible area in a first configuration, the convertible area including one or more electronic gaming components;

removing the one or more electronic gaming components from the convertible area to create a void in a gaming cabinet of the gaming machine;

providing a unitary insert having a usable storage space portion configured to store one or more patron items, the unitary insert excluding any electronic gaming components; and positioning the unitary insert in the void for converting the gaming machine from the first configuration to a second configuration such that the unitary insert is not electrically coupled to any electronic component in the gaming machine.

2. The method of claim 1, wherein the unitary insert is positioned such that the usable storage space portion is located entirely below a primary display of the gaming machine and partially below a top surface of a ledge portion of the gaming cabinet.

3. The method of claim 1, further comprising removably coupling the unitary insert with the gaming cabinet using a fastener connection, the fastener connection excluding a hinge.

4. The method of claim 1, wherein the usable storage space portion has a distinct cup holding portion.

5. A method of conducting a wagering game on a gaming machine, the method comprising:

receiving a wager input from a player;

in response to receiving the wager input, displaying a randomly selected outcome on at least one display mounted to a gaming cabinet of the gaming machine;

replacing one or more electronic gaming components in a convertible area of the gaming machine with an insert, the insert excluding any electronic gaming components such that the insert is not electrically coupled to any electronic component in the gaming machine; and receiving one or more patron items in the insert, the insert being positioned at least partially below the at least one display and at least partially below a top surface of a ledge portion of the gaming machine.

6. The method of claim 5, wherein the receiving the one or more patron items includes receiving a beverage in a distinct cup holding portion, the distinct cup holding portion being formed as an integral portion of the insert.

7. The method of claim 6, wherein the distinct cup holding portion includes insulation.

8. The method of claim 6, further comprising activating a switch to turn on a refrigeration or heating element in the distinct cup holding portion.

9. The method of claim 1, wherein the usable storage space portion of the unitary insert comprises a substantially planar surface and a partially curved back surface, the partially curved back surface being adjacent to and extending upwardly from the substantially planar surface.

10. The method of claim 1, wherein the one or more electronic gaming components include one or more of information readers, displays, player-input devices, player-tracking devices, buttons, speakers, lights, coin accepters, bill accepters, and printers.

11. The method of claim 1, wherein the usable storage space portion of the unitary insert has a sloped bottom portion.

12. The method of claim 4, wherein the distinct cup holding portion includes insulation.

13. The method of claim 4, further comprising activating a switch to turn on a refrigeration or heating element in the distinct cup holding portion.

14. A method for converting a convertible area of a gaming machine from a first configuration to a second configuration, comprising:

providing the convertible gaming machine including:

(i) a gaming cabinet having an extended front ledge portion, the extended front ledge portion having a substantially planar top surface;

(ii) at least one display mounted to the gaming cabinet for displaying randomly selected outcomes of a wagering game; and (iii) a convertible area located entirely below the at least one display and partially below the substantially planar top surface of the extended front ledge portion, the first configuration of the convertible area including one or more electronic gaming components;

replacing the one or more electronic gaming components in the convertible area of the gaming machine with an insert having a usable storage portion configured to store one or more patron items, thereby converting the convertible area from the first configuration to the second configuration, the insert excluding any electronic gaming components such that the insert is not electrically coupled to any electronic component in the gaming machine.

15. The method of claim 14, further comprising positioning the insert such that the usable storage portion is located entirely below the at least one display of the gaming machine and partially below the substantially planar top surface of the extended front ledge portion of the gaming cabinet.

16. The method of claim 14, further comprising removably coupling the insert with the gaming cabinet using a fastener connection, the fastener connection excluding a hinge.

17. The method of claim 14, wherein the usable storage portion has a distinct cup holding portion.

18. The method of claim 17, wherein the distinct cup holding portion includes insulation.

19. The method of claim 17, further comprising activating a switch to turn on a refrigeration or heating element in the distinct cup holding portion.

20. The method of claim 14, wherein the usable storage portion of the insert comprises a substantially planar surface and a partially curved back surface, the partially curved back surface being adjacent to and extending upwardly from the substantially planar surface.

21. The method of claim 14, wherein the one or more electronic gaming components include one or more of information readers, displays, player-input devices, player-tracking devices, buttons, speakers, lights, coin accepters, bill accepters, and printers.

22. The method of claim 14, wherein the usable storage portion of the insert has a sloped bottom portion.

* * * * *